US007021879B2

(12) United States Patent
Taneichi

(10) Patent No.: US 7,021,879 B2
(45) Date of Patent: Apr. 4, 2006

(54) ANCHORAGE FIXED AT CORNER PART OF WOOD

(76) Inventor: Kaoru Taneichi, 463-11 Aiko, Atsugi-shi, Kanagawa (JP)

(*) Notice: Subject to any disclaimer, the term of this patent is extended or adjusted under 35 U.S.C. 154(b) by 295 days.

(21) Appl. No.: 10/602,814

(22) Filed: Jun. 23, 2003

(65) Prior Publication Data

US 2004/0094231 A1 May 20, 2004

(30) Foreign Application Priority Data

Nov. 20, 2002 (JP) ............................ 2002-336356

(51) Int. Cl.
*F16B 1/00* (2006.01)
*E04B 1/38* (2006.01)

(52) U.S. Cl. ....................... 411/466; 411/469; 411/921; 403/230; 403/382; 403/403; 52/713

(58) Field of Classification Search ................ 411/466, 411/469, 457, 461, 921; 403/403, 381, 382, 403/230; 52/712, 713, 288.1, 655.1, 656.9
See application file for complete search history.

(56) References Cited

U.S. PATENT DOCUMENTS

| | | | | |
|---|---|---|---|---|
| 1,795 | A * | 9/1840 | Leek | 241/258 |
| 409,546 | A * | 8/1889 | Zeigler | 403/281 |
| 2,229,395 | A * | 1/1941 | Stock | 411/466 |
| 2,396,030 | A * | 3/1946 | Terry | 285/405 |
| 3,082,492 | A * | 3/1963 | Grubb | 403/381 |
| 3,305,252 | A * | 2/1967 | Jureit | 403/170 |
| 3,417,652 | A * | 12/1968 | Menge | 411/466 |
| 3,427,055 | A * | 2/1969 | Coovert et al. | 217/65 |
| 3,498,171 | A * | 3/1970 | Jureit | 411/466 |
| 3,601,428 | A * | 8/1971 | Gilb | 403/232.1 |
| 3,828,514 | A * | 8/1974 | Jureit | 403/230 |
| 4,019,298 | A * | 4/1977 | Johnson, IV | 52/590.1 |
| 4,209,265 | A * | 6/1980 | Moehlenpah | 403/230 |
| 4,297,048 | A * | 10/1981 | Jureit et al. | 403/189 |
| 4,480,941 | A * | 11/1984 | Gilb et al. | 403/232.1 |
| 4,784,509 | A * | 11/1988 | Gozzano | 403/24 |
| 5,071,280 | A * | 12/1991 | Turner | 403/232.1 |
| 5,138,810 | A * | 8/1992 | Kartler | 52/254 |
| 5,410,854 | A * | 5/1995 | Kimmell et al. | 52/712 |
| 5,419,649 | A * | 5/1995 | Gilb | 403/231 |
| 6,171,043 | B1 * | 1/2001 | Williams | 411/466 |
| 6,698,971 | B1 * | 3/2004 | Wilhelmi | 403/403 |
| 2002/0020135 | A1 * | 2/2002 | Grove et al. | 52/702 |

* cited by examiner

*Primary Examiner*—Robert Canfield
(74) *Attorney, Agent, or Firm*—Jordan and Hamburg LLP

(57) ABSTRACT

The anchorage used at a corner part of woods includes a first anchorage including a first anchorage body; nails, punching on a long side plate of the first anchorage body; and nail insertion holes formed at the short side plate of the first anchorage body; and a second anchorage including a second anchorage body, forming via a bended part which overlaps with the short side plate of the first anchorage; nails, punching on a base plate of the second anchorage body; and nails formed in the shape of an overlapped pin, punching on an overlapped part of the second anchorage body so as to insert into the nail insertion holes of the first anchorage. Therefore, it can perform the attachment work easily; it can fix at the corner part by sufficient intensity; and it can attach to the corner part without forming a insertion hole for the bolt.

3 Claims, 17 Drawing Sheets

ANCHORAGE FIXED AT CORNER PART OF WOOD

BACKGROUND OF THE INVENTION

This invention relates to an anchorage used at a corner part of the jointed wood, especially the anchorage which fixes the connection part located between one beam and another beam, the beam and joint and the like.

Conventionally, the connection part located between the beam and beam of the timbered house, the beam and joint, and the like is driven by a nail at an inclination state and fixed, or it is fixed by a battledore bolt Conventional method for fixing of the connection part using the nail cannot fix by sufficient intensity.

Moreover, in the case of using the battledore bolt, there is only a function which pulls the beam and joint mutually, and the bolt insertion hole has to be formed. Therefore, it is hard to perform such work, and the intensity of the beam joint is reduced according to the hole.

SUMMARY OF THE INVENTION

In light of the forgoing, it is an object of the invention to provide an anchorage which can prevent a gap of a beam and joint and the like. It is another object of the invention to provide an anchorage which can perform the attachment work easily. It is a further object of the invention to provide an anchorage which can fix at the corner part by sufficient intensity. It is still further object of the invention to provide an anchorage which can attach to the corner part without forming a insertion hole for the bolt.

Novel features which are believed to be characteristic of the invention, both as to its organization and method of operation, together with further objects and advantages thereof, are described below with reference to the accompanying drawings in which preferred embodiments of the invention are illustrated as an example.

It is to be expressly understood, however, that the drawings are for the purpose of illustration and description only, and are not intended as a definition of the limits of the invention.

DETAILED DESCRIPTION OF THE PREFERRED EMBODIMENTS

Figure 1:
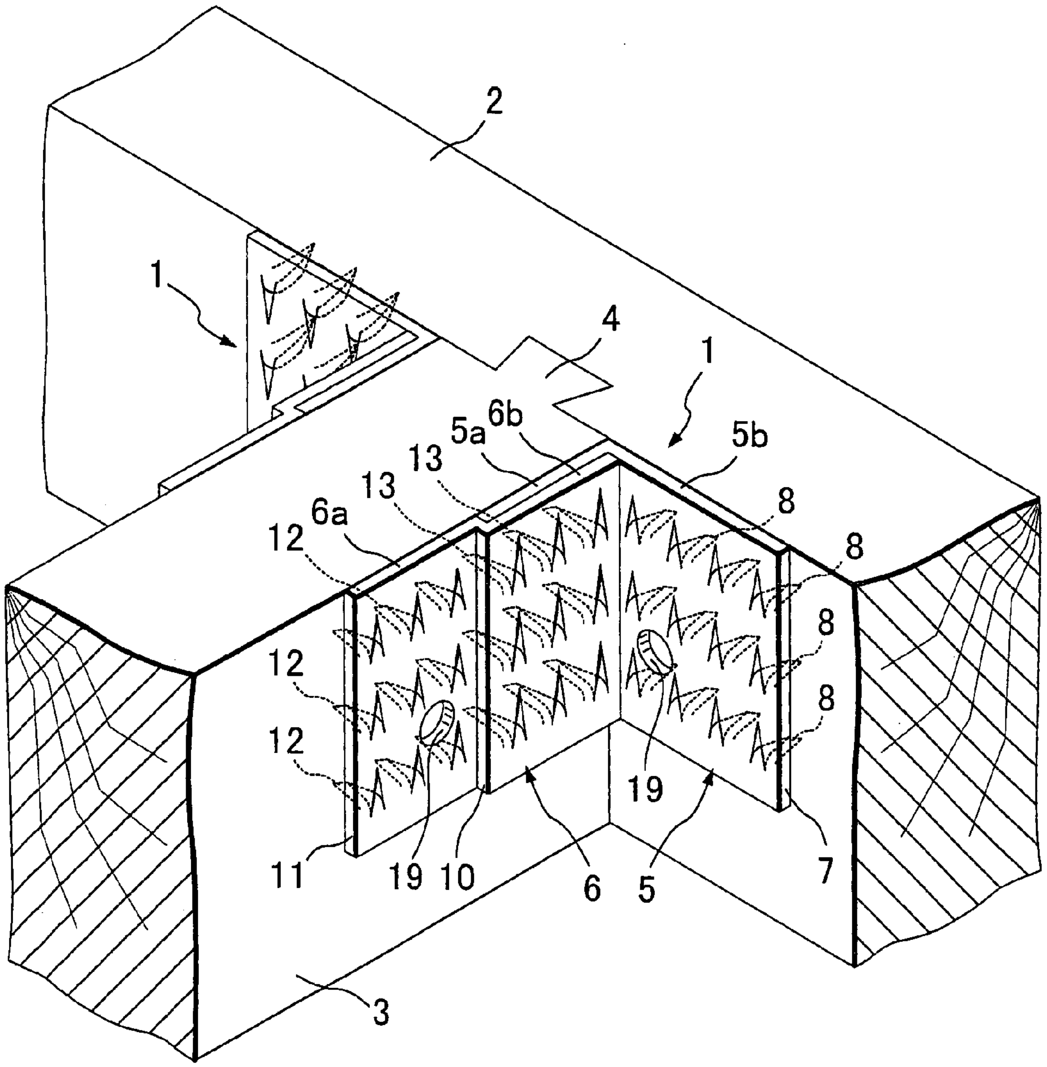
FIG. 1 is an explanation view when in use, showing a first embodiment of the present invention.
Figure 2:
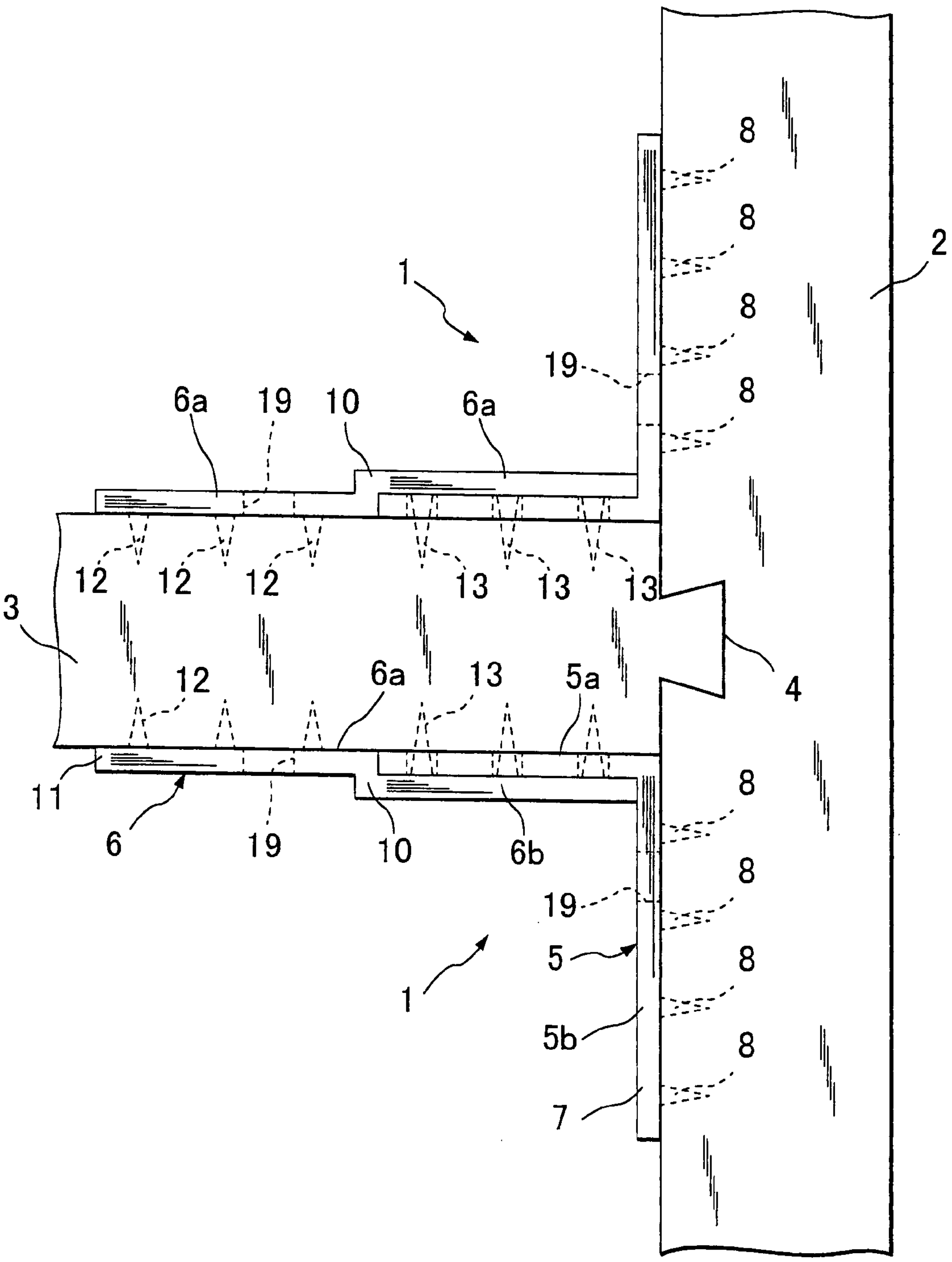
FIG. 2 is a plan view when in use.
Figure 3:
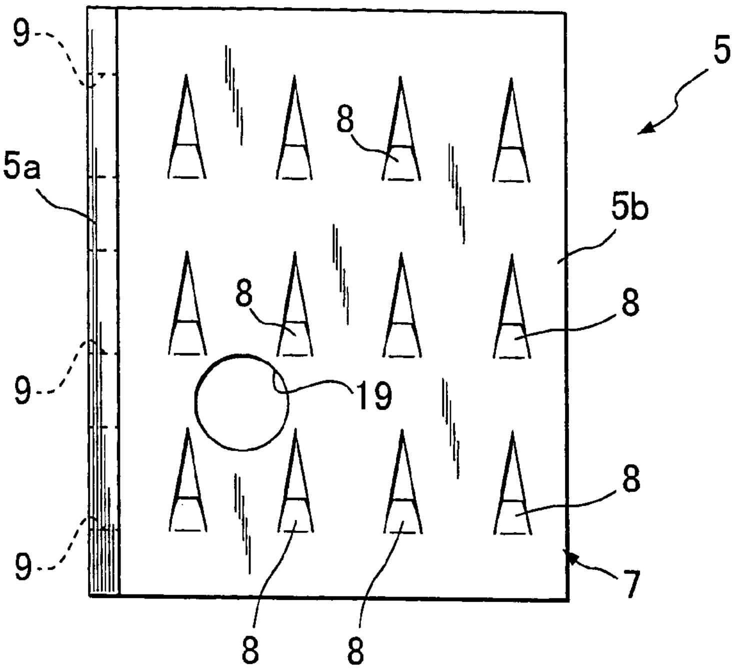
FIG. 3 is a front view of a first anchorage.
Figure 4:
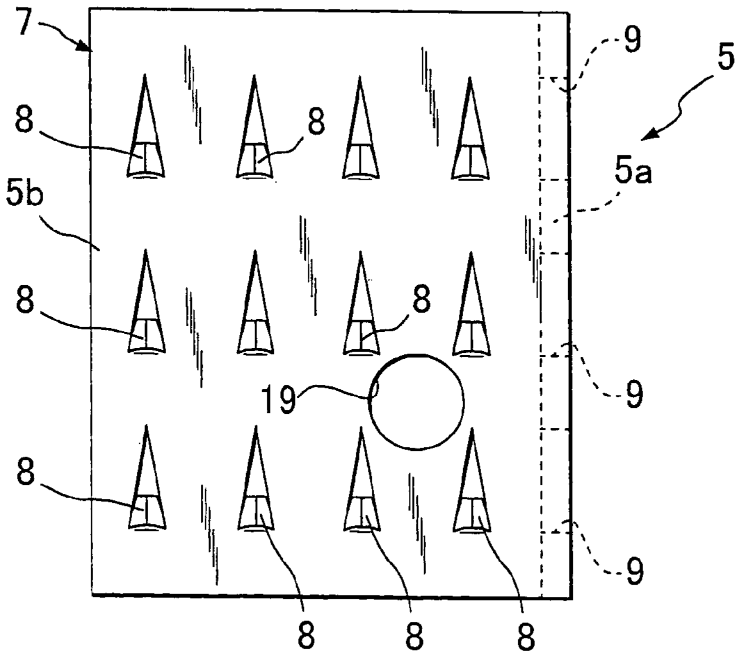
FIG. 4 is a back view of a first anchorage.
Figure 5:
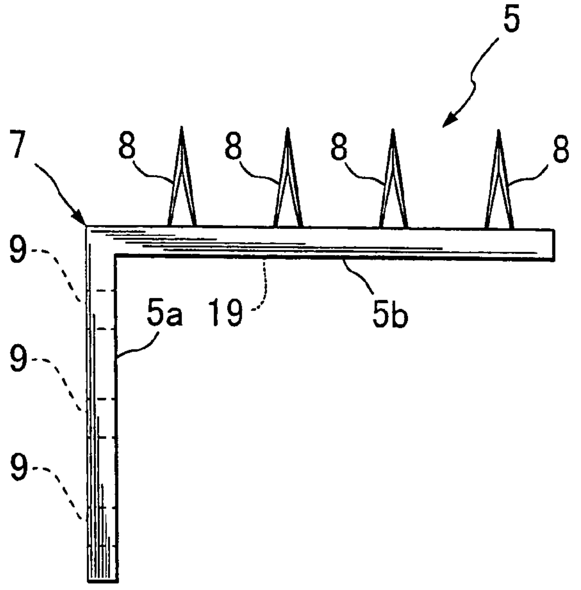
FIG. 5 is a plan view of a first anchorage.
Figure 6:
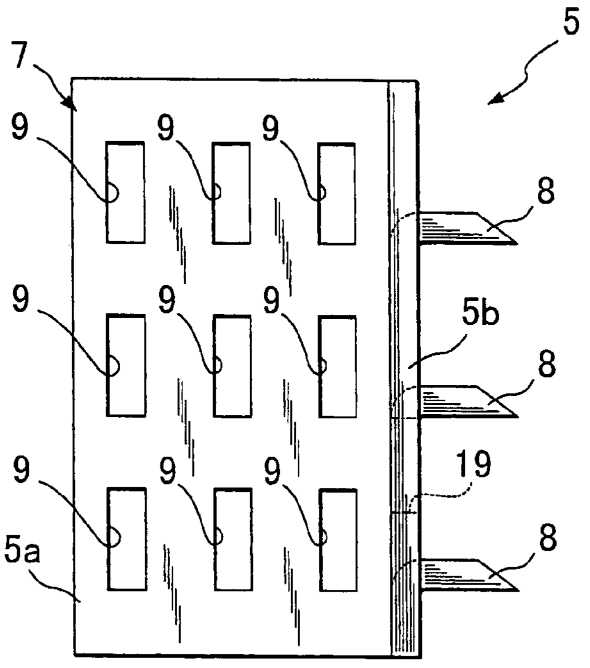
FIG. 6 is a right side view of a first anchorage.
Figure 7:
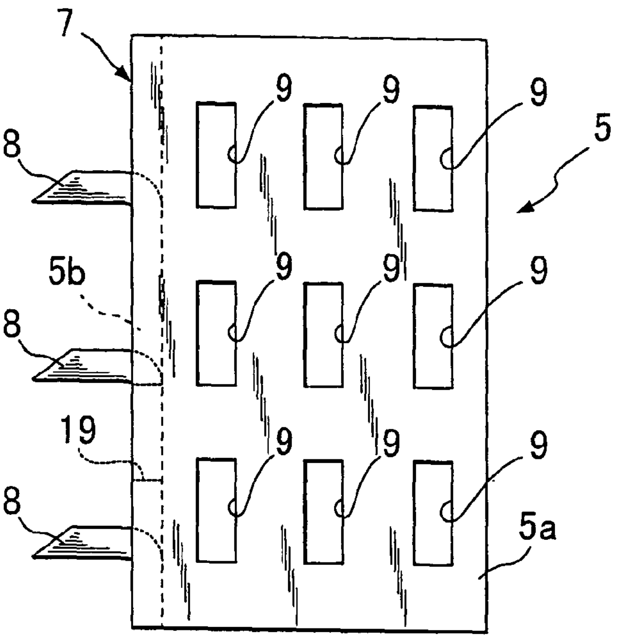
FIG. 7 is a left side view of a first anchorage.
Figure 8:
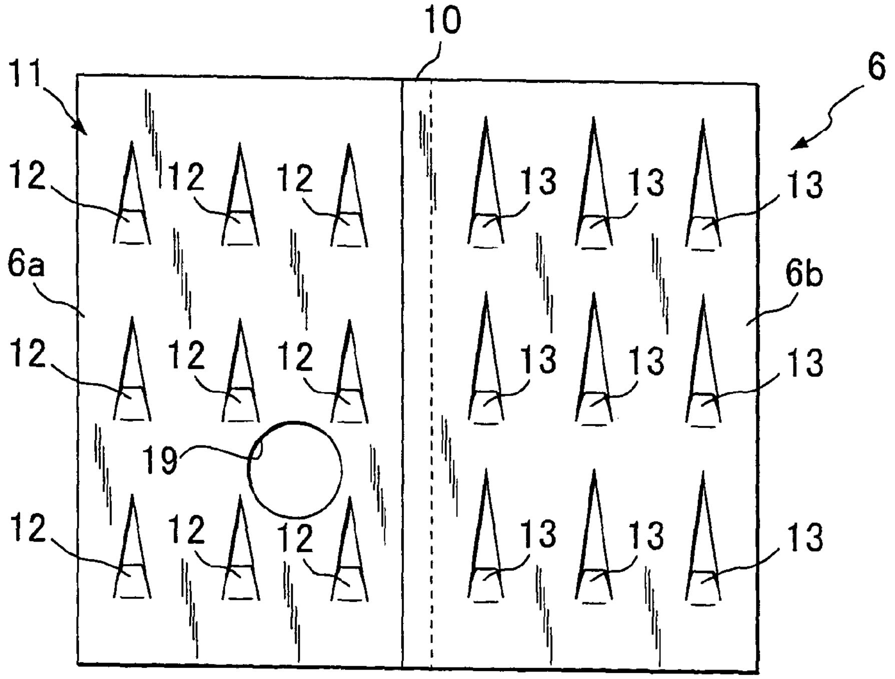
FIG. 8 is a front view of a second anchorage.
Figure 9:
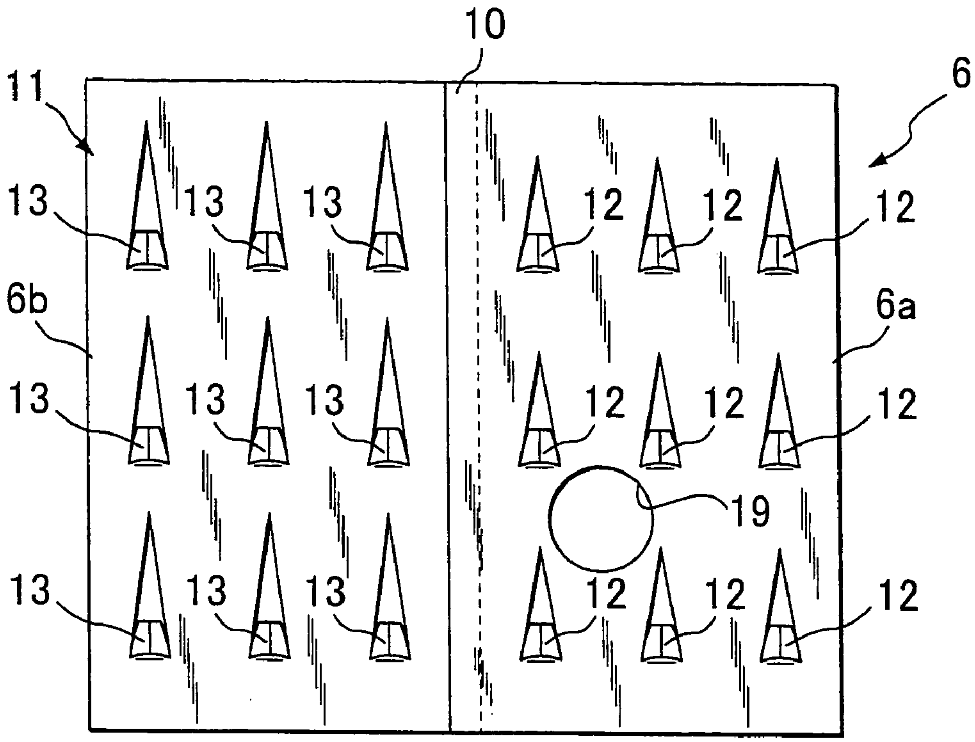
FIG. 9 is a back view of a second anchorage.
Figure 10:
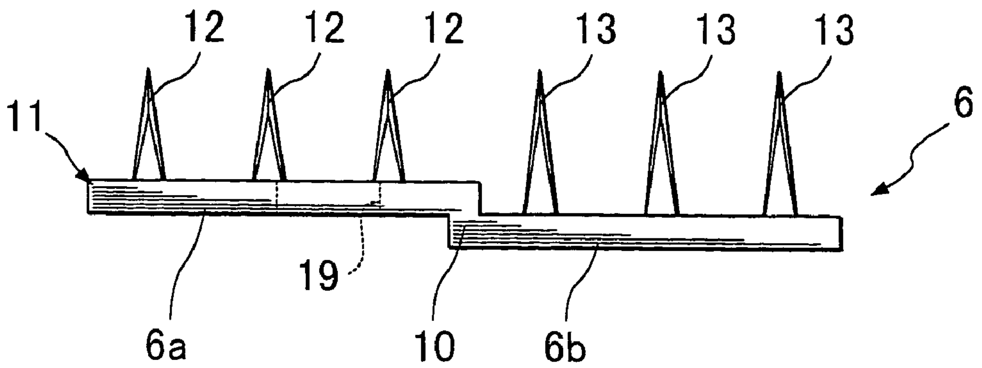
FIG. 10 is a plan view of a second anchorage.
Figure 11:
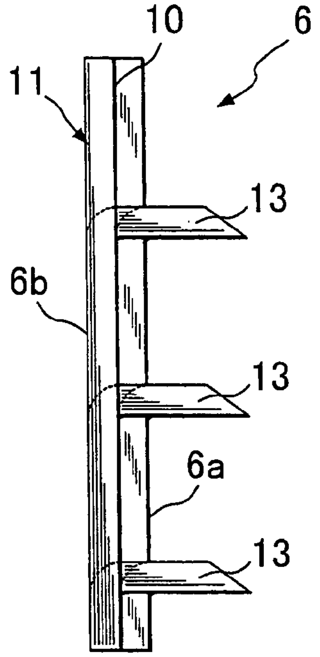
FIG. 11 is a right side view of a second anchorage.
Figure 12:
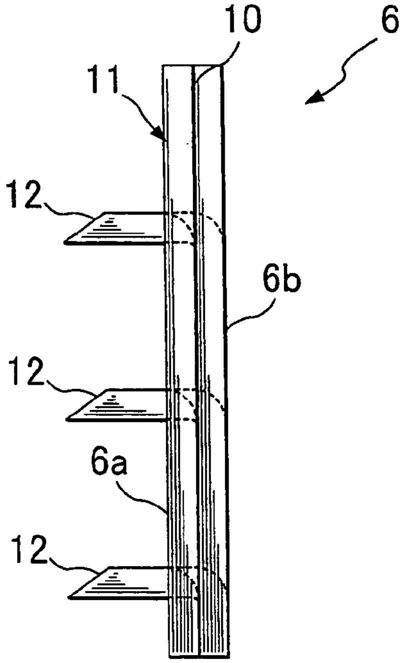
FIG. 12 is a left side view of a second anchorage.

Preferred embodiments of the present invention are described in more detail below with reference to the accompanying drawings.

FIGS. 1–14 illustrate an anchorage at a corner of wood in accordance with a first embodiment of the present invention.

The numeral 1 shows the anchorage which is used at a corner part located between the woods and which can fix a connection part 4 of a beam 2 and a joint 3 of a timbered house. The anchorage 1 is comprised of a first anchorage 5 formed in the shape of a L letter and a second anchorage 6 which overlaps a short side plate 5*a* of the first anchorage 5.

As shown in FIGS. 3 to 7, the first anchorage 5 is comprised of a first anchorage body 7 formed in the shape of a L letter; a plurality of nails 8 formed in the shape of a pin, punching on a long side plate 5*b* of the first anchorage body 7 and projecting to a angle direction; a plurality of nail insertion holes 9 formed in the shape of a pin and formed at the short side plate 5*a* of the first anchorage body 7; and a bolt insertion hole 19 for battledore bolts, forming when needed.

As shown in FIGS. 8 to 12, the second anchorage 6 is comprised of a second anchorage body 11 formed in the shape of a crank, forming via a bended part so as to overlap the short side plate 5*a* of the first anchorage 5; a plurality of nails 12 formed in the shape of a pin, punching on a base plate 6*a* of the second anchorage body 11 and projecting to a angle direction; a plurality of nails 13 formed in the shape of an overlapped pin, punching on an overlapped part 6*b* of the second anchorage body 11 so as to be inserted into the nail insertion holes 9 of the first anchorage 5, projecting to a angle direction, locating the tip portion thereof at the same portion of the tip portion of the nail 12; and the bolt insertion hole 19 for battledore bolts, forming when needed.

Figure 13:
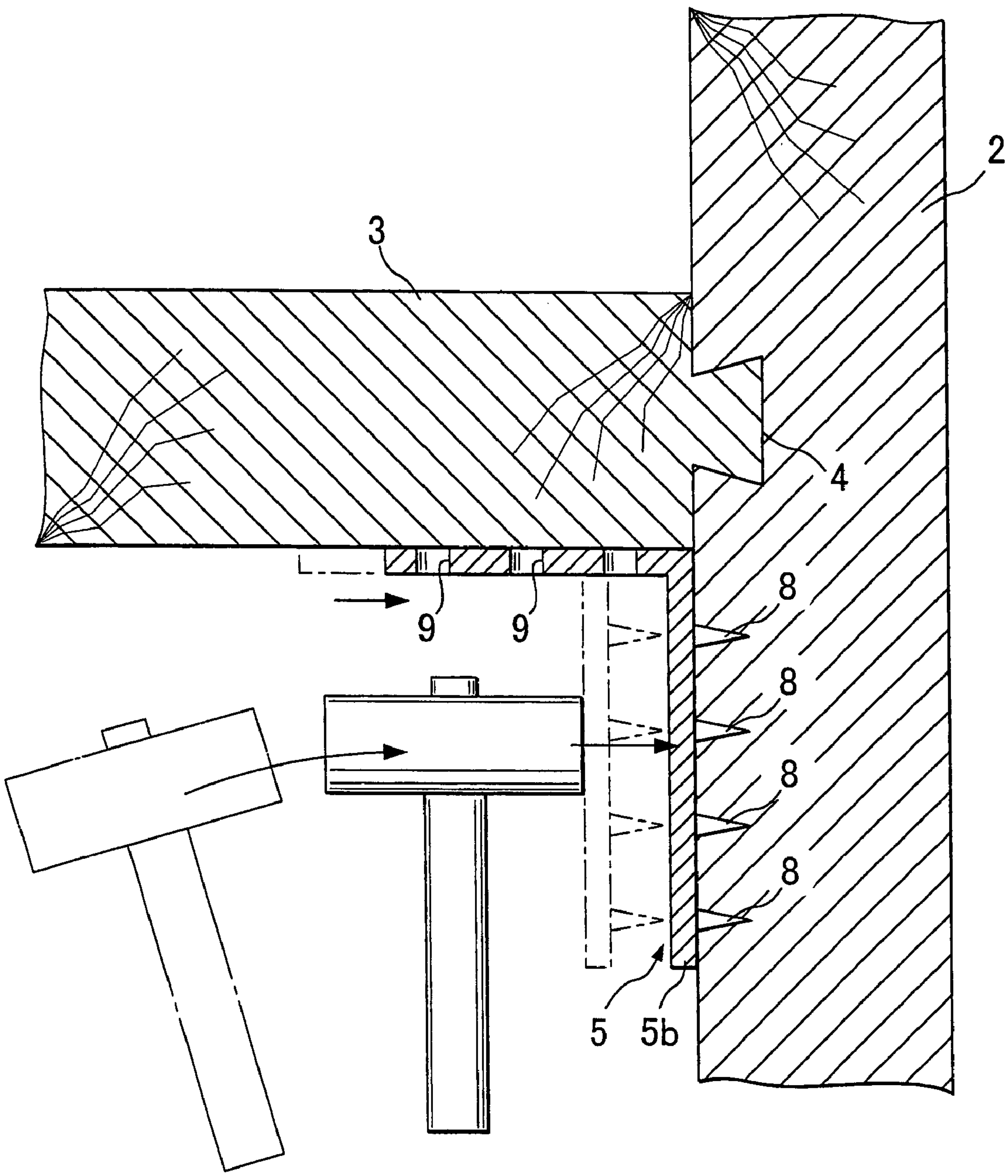
FIG. 13 is an explanation view of a first anchorage.

In the anchorage 1 at the corner part located between the woods, as shown in FIG. 13, the first anchorage 5 is located at the corner part 4 between the beam 2 and joint 3, and the long side plate 5*b* is hit by a hammer 14 such as a press, an air hammer and the like. Then, the nails 8 are sticked joint 3 and fixed.

Figure 14:
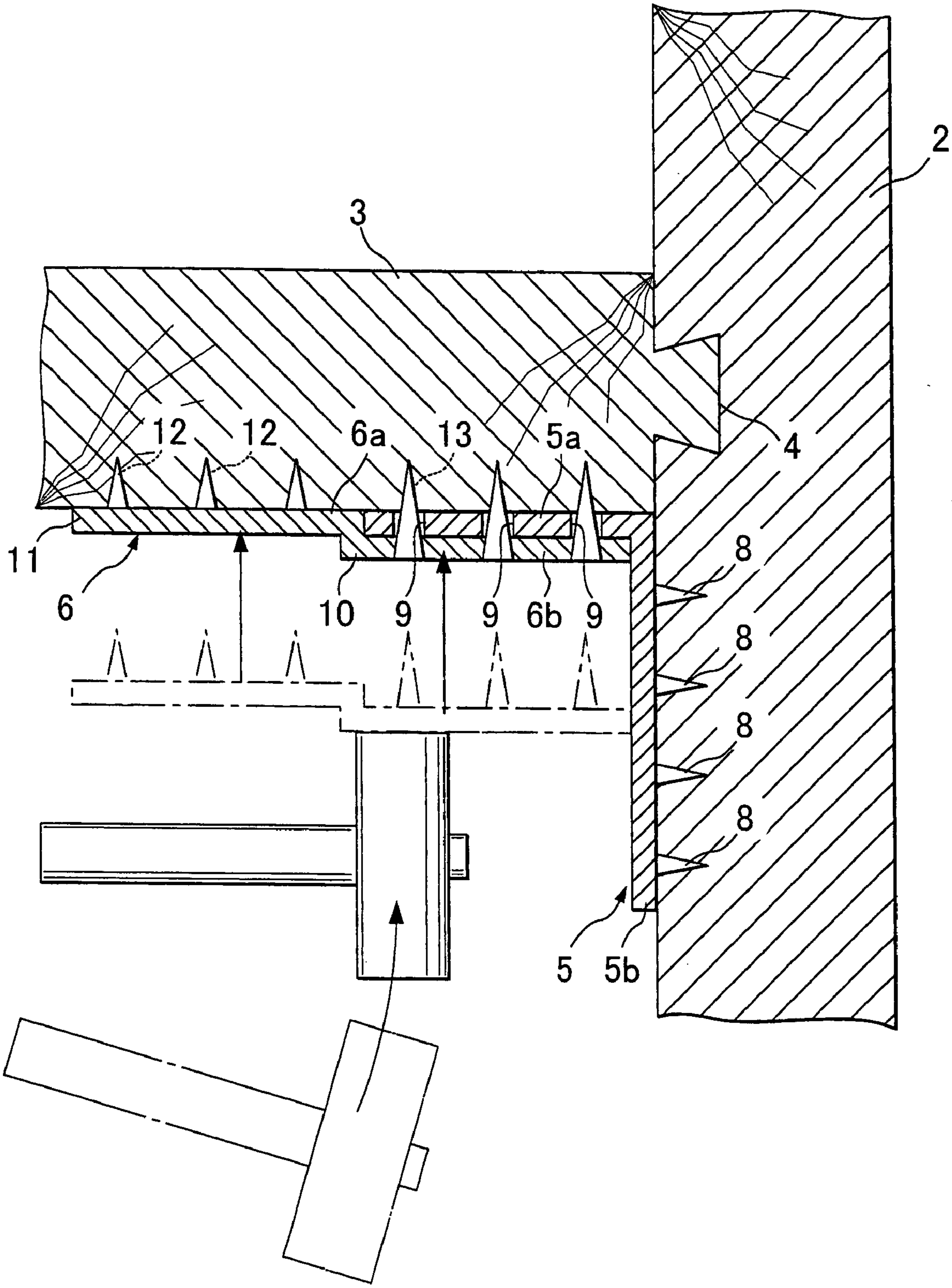
FIG. 14 is an explanation view of attachment of a second anchorage.

After that, as shown in FIG. 14, the overlapped part 6*b* of the second anchorage 6 is overlapped on the short side plate 5*a* of the first anchorage 5 fixed at the joint 3 so that the nails 13 are inserted into the nail insertion holes 9. Then, the base plate 6*a* and overlapped part 6*b* are hammered by the hammer 14, and the nails 12 and 13 stick and are fixed to the beam 2. Therefore, the first anchorage 5 and the second anchorage 6 are overlapped at a L-letter state each other, and they are fixed at the corner part of the connection part 4 between the beam 2 and joint 3 integrally. Therefore, the reinforcement of the connection part 4 between the beam 2 and joint 3 can be improved.

Moreover, the battledore bolt can be attached using the bolt insertion holes 19 and 19 for the battledore bolts.

Other embodiments of the present invention will now be described with reference to FIGS. 15–26. In FIGS. 15–26, the same components as in the first embodiment described above with reference to FIGS. 15–26 are designated by the same reference numerals and therefore will not be further explained in great detail.

Figure 15:
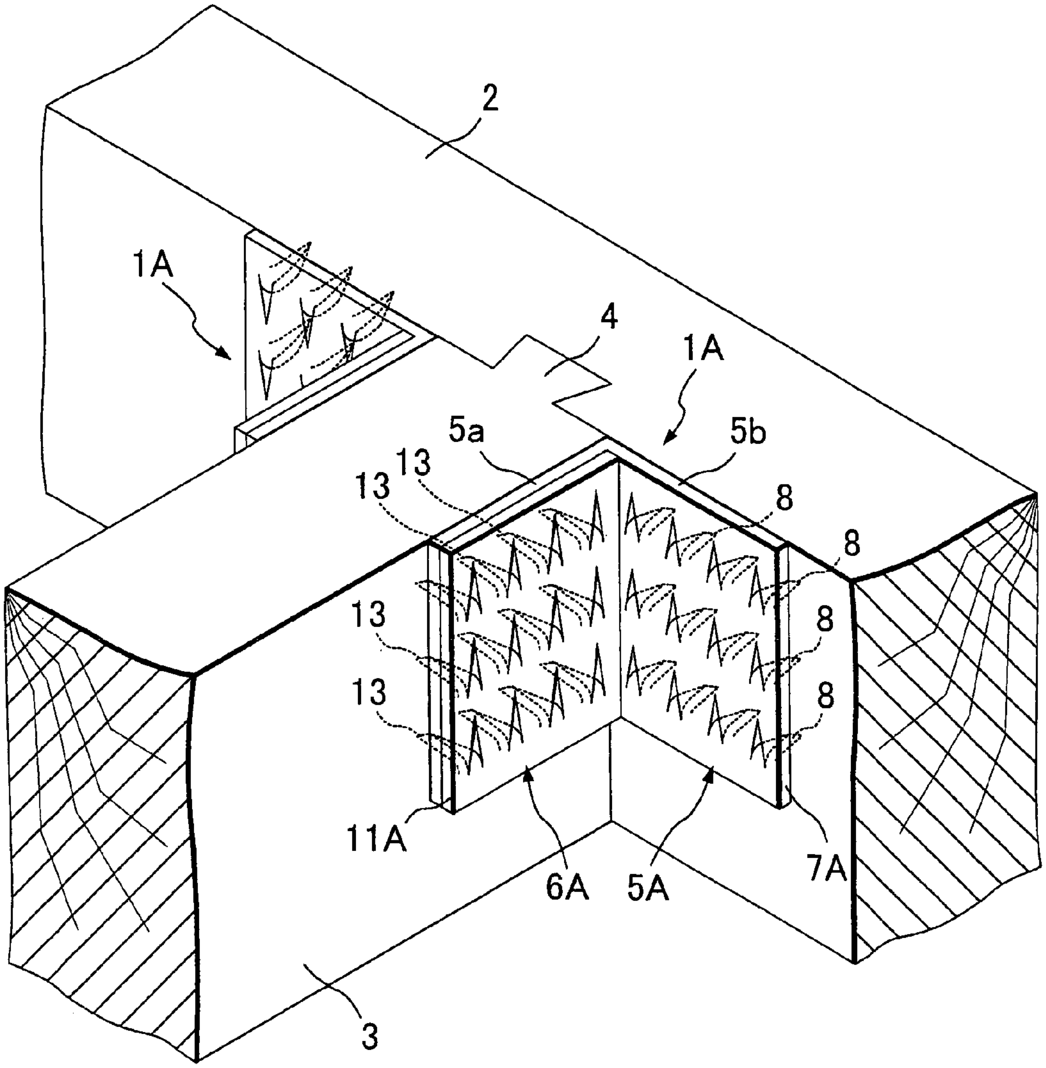
FIG. 15 is an explanation view when in use, showing a first embodiment of the present invention.
Figure 16:
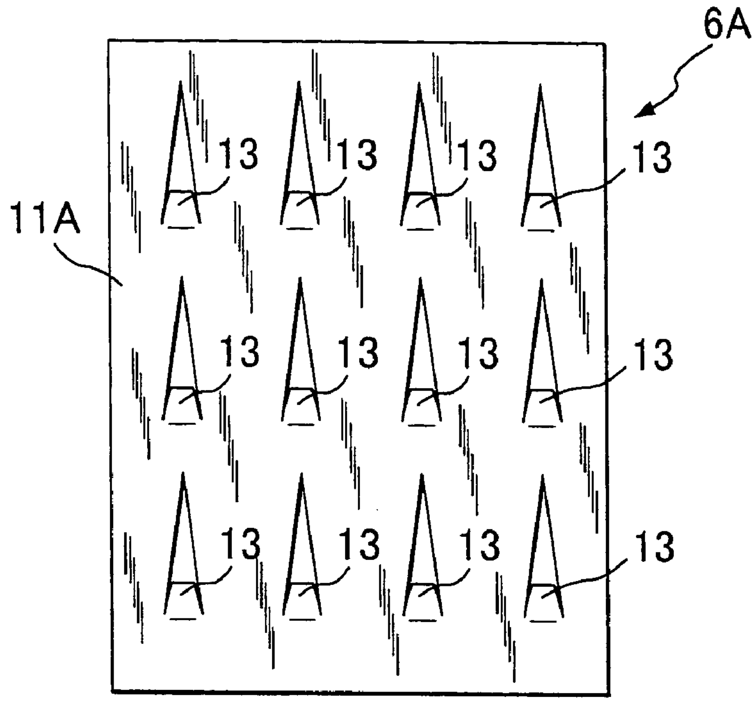
FIG. 16 is a front view of a second anchorage.
Figure 17:
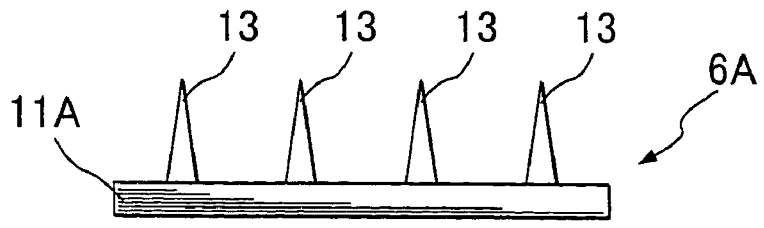
FIG. 17 is a plan view of a second anchorage.

A second embodiment of the present invention is shown in FIGS. 15–17. It is distinguished from the first embodiment in that the first anchorage 5 is replaced from another first anchorage 5A, and the second anchorage 6 is replaced from another second anchorage 6A. The first anchorage 5A has the plurality of pins 8 punching on the long side plate 5*b* of the first anchorage body 7 formed in the shape of an angle, forming the nail insertion holes 9 provided at the short side plate 5*a*. The second anchorage 6A has the plurality of nails 13 formed at a second anchorage body 11A that overlaps the short side plate 5*a* of the first anchorage 5A, inserting into the nail insertion holes 9 of the short side plate 5*a* of the first anchorage 5A and having an insertion amount to the wood as same as the insertion amount of the nails 8 of the first anchorage 5A. A corner anchorage 1A with the first anchorage 5A and second anchorage 6A according to the second embodiment has similar advantages to that according to the first embodiment.

Figure 18:
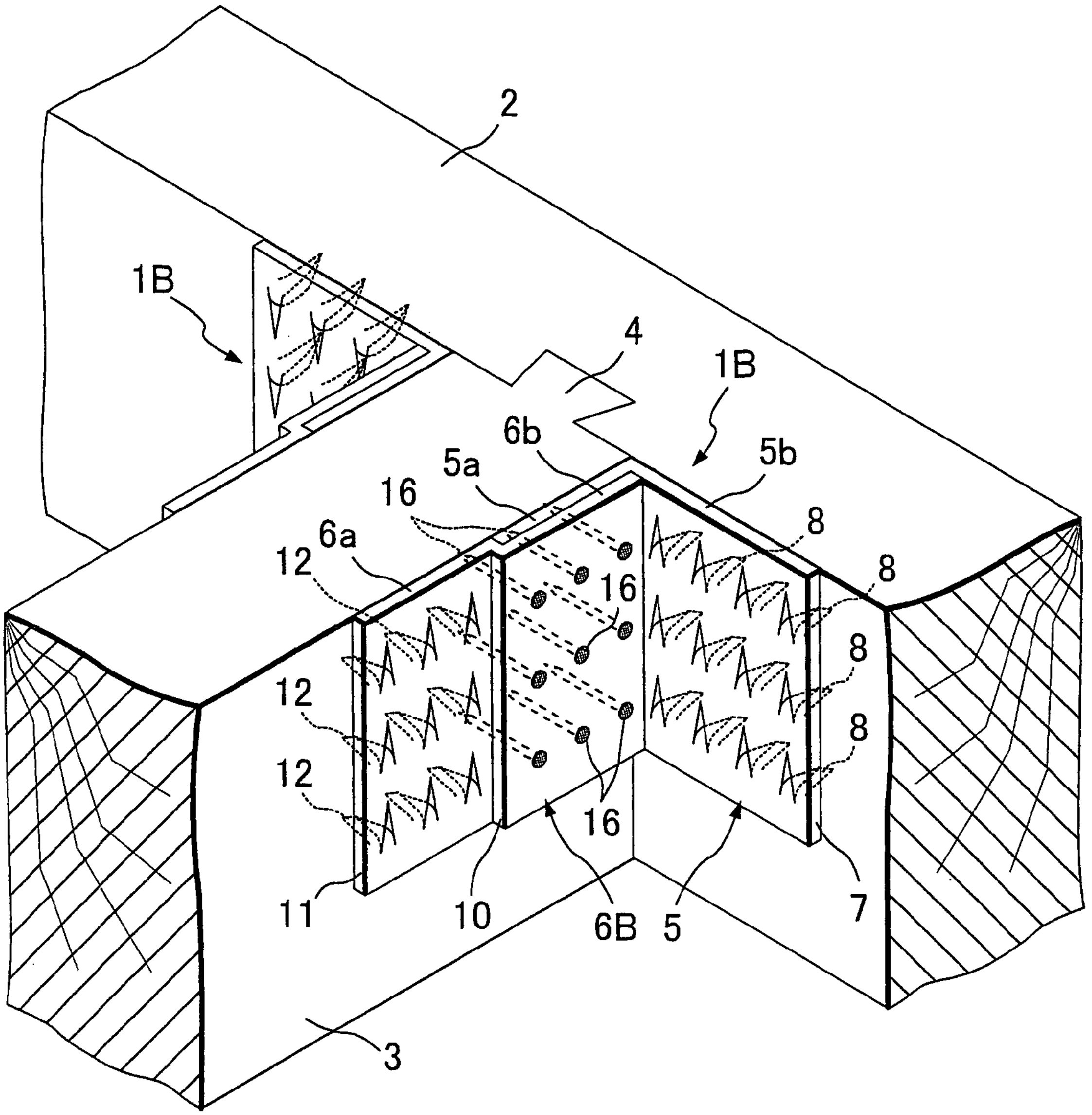
FIG. 18 is an explanation view when in use, showing a third embodiment of the present invention.
Figure 19:
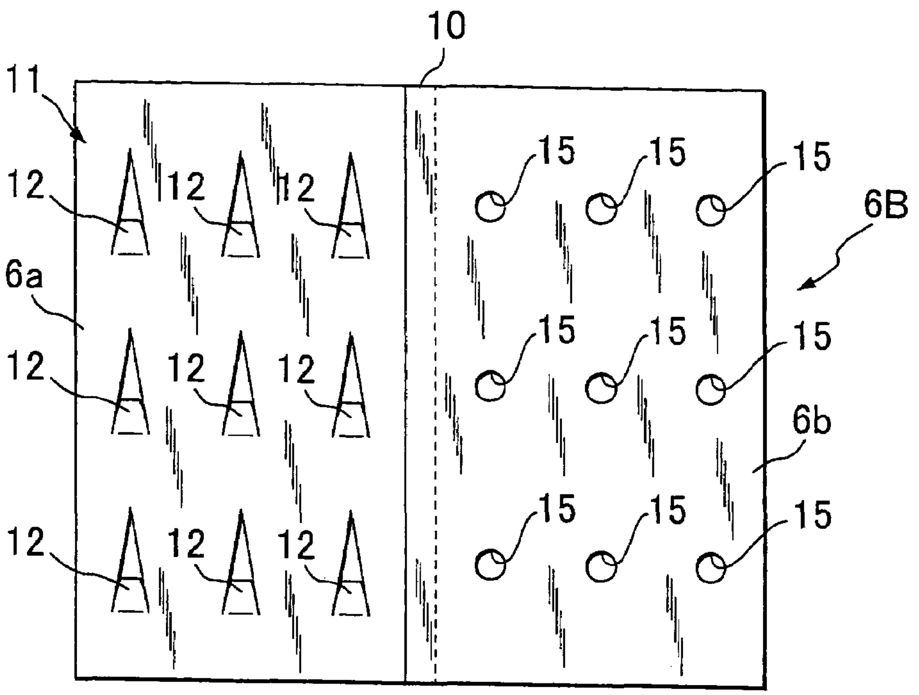
FIG. 19 is a front view of a second anchorage.
Figure 20:
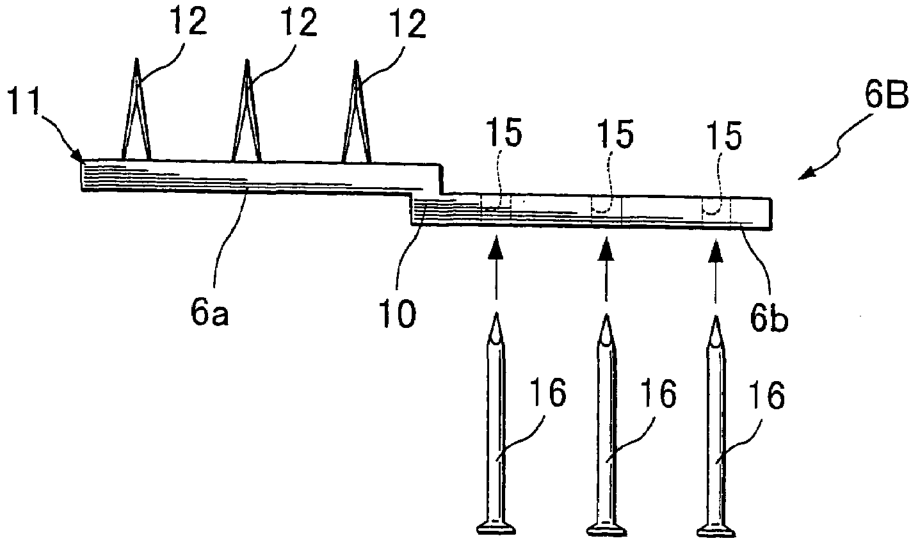
FIG. 20 is a front view of a second anchorage.
Figure 21:
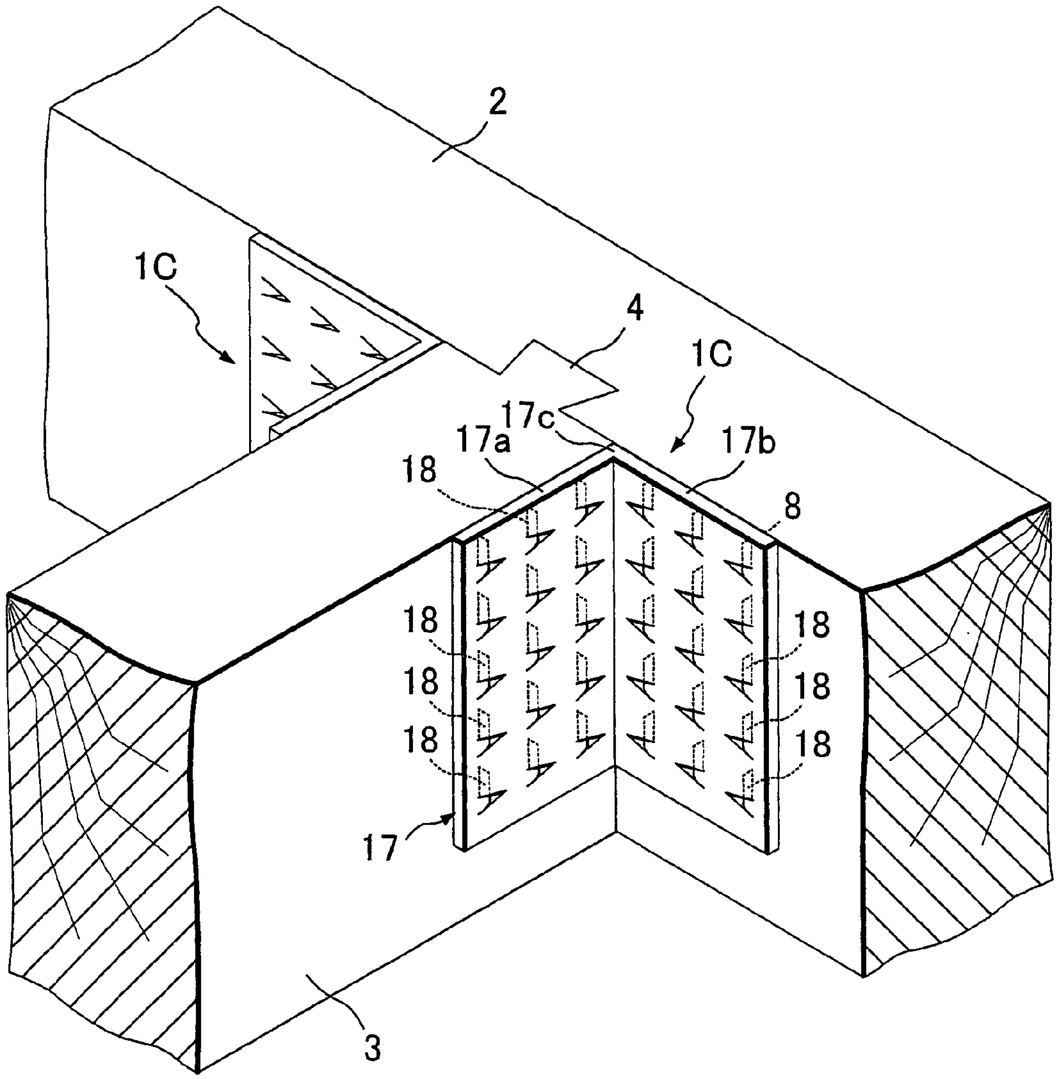
FIG. 21 is an explanation view when in use, showing a fourth embodiment of the present invention.
Figure 22:
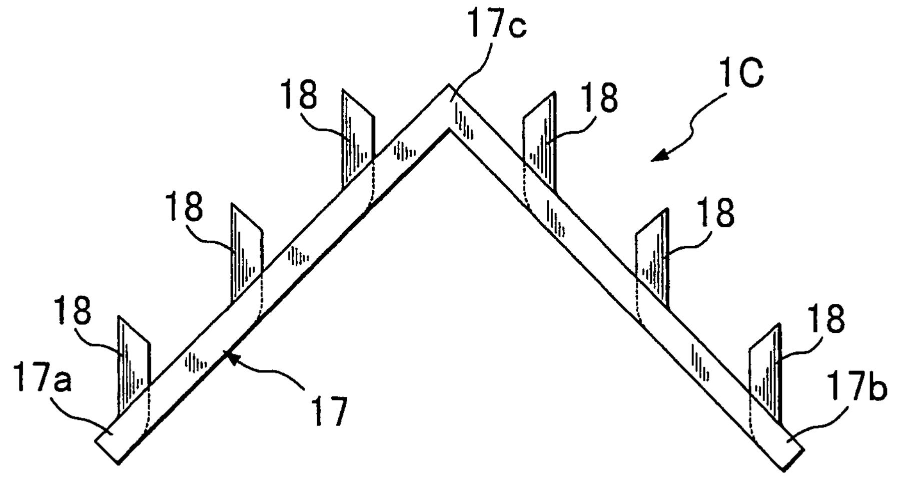
FIG. 22 is a plan view
Figure 23:
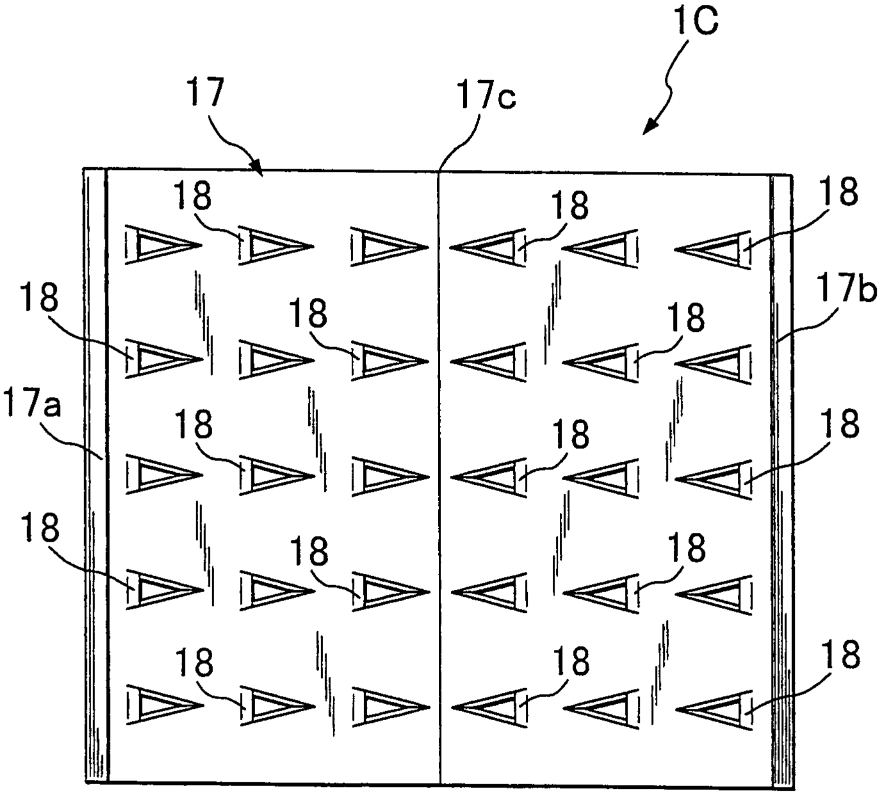
FIG. 23 is a front view.
Figure 24:
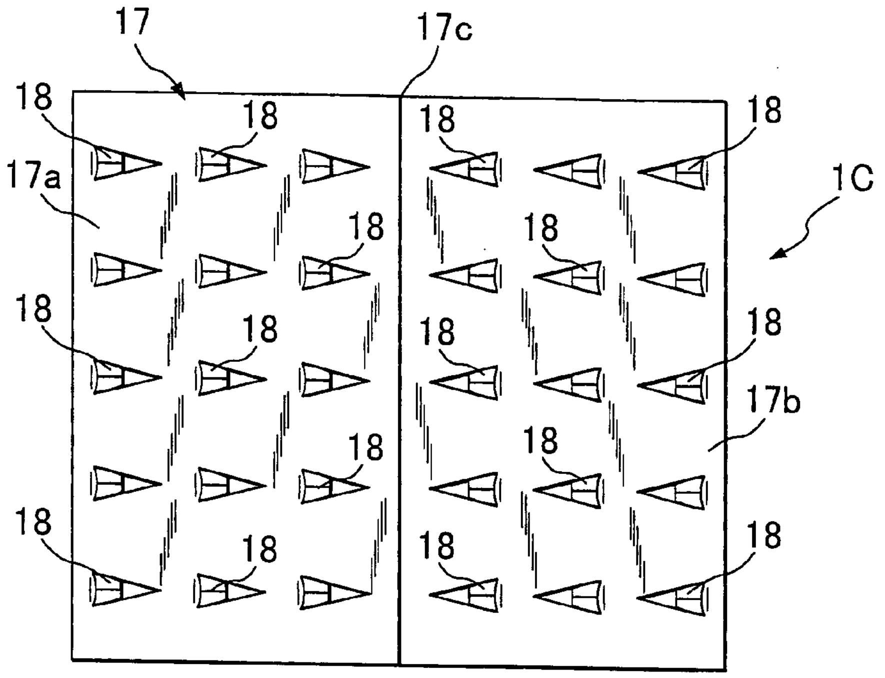
FIG. 24 is a back view.
Figure 25:
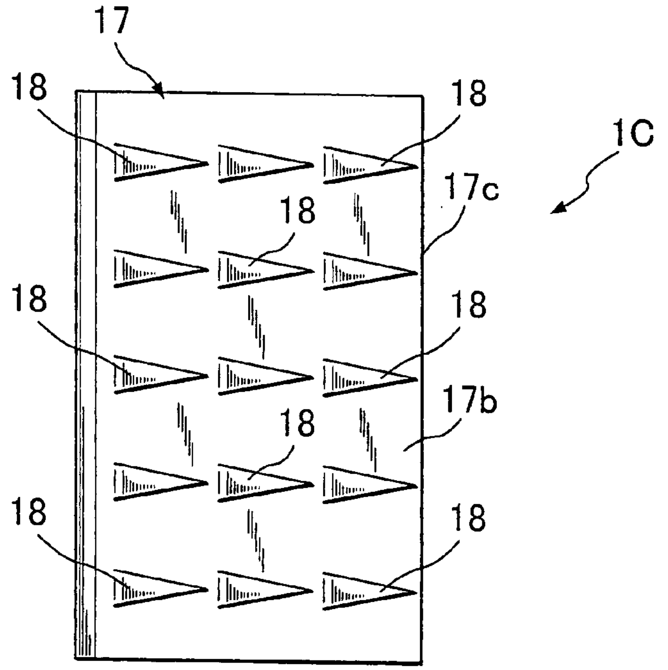
FIG. 25 is a side view.
Figure 26:
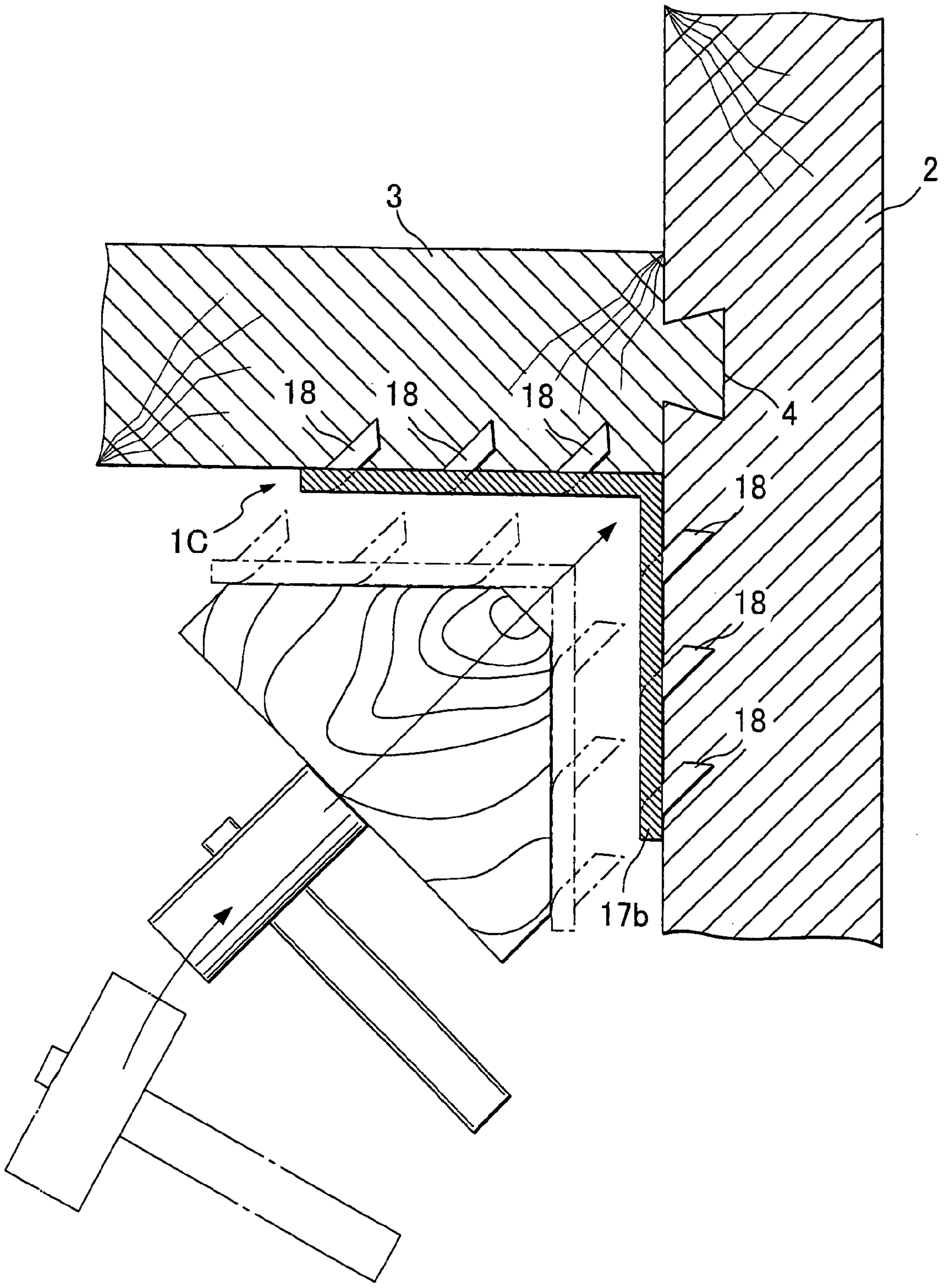
FIG. 26 is an explanation view of attachment.

A third embodiment of the present invention is shown in FIGS. 18–20. It is distinguished from the first embodiment in that the second anchorage 6 is replaced from another second anchorage 6B. The second anchorage 6B has insertion holes 15 for nails and the like formed at the overlapped part 6*b* of the second anchorage body 11, corresponding to the nail insertion holes 9 provided at the short side plate 5*a*. After the first anchorage 5 is fixed to the joint 3, the overlapped part 6*b* of the second anchorage 6B overlaps with the short side plate 5*a* and is fixed to the beam 2. After that, the nails 16 are hammered at the insertion holes 15 respectively, and the first anchorage 5 and the second anchorage 6B are fixed by the nails 16 together. A corner anchorage 1B may be formed.

A fourth embodiment of the present invention is shown in FIGS. 21–26. It is distinguished from the first embodiment in that a plurality of nails 18 is formed and punched at both side plates 17*a* and 17*b* of an angle anchorage 17 so as to formed at 45 degrees of the inclination angle $\alpha$ by side of a corner part 17*c*. A corner anchorage 1C according to the fourth embodiment has similar advantages to that according to the first embodiment when the beam 2 and joint 3 are used of the wood which is hammered the nails easily.

As set forth above, the advantages of the invention are as follows:

(1) The anchorage used at a corner part of woods includes a first anchorage including a first anchorage body formed in the shape of a L letter; a plurality of nails formed in the shape of a pin, punching on a long side plate of the first anchorage body; and a plurality of nail insertion holes formed in the shape of a pin and formed at the short side plate of the first anchorage body; and a second anchorage including a second anchorage body formed in the shape of a crank, forming via a bended part which overlaps with the short side plate of the first anchorage; a plurality of nails formed in the shape of a pin, punching on a base plate of the second anchorage body; and a plurality of nails formed in the shape of an overlapped pin, punching on an overlapped part of the second anchorage body so as to insert into the nail insertion holes of the first anchorage. Therefore, after the first anchorage is located at the corner part and fixed the nails to the beam and joint by the hammer, the nails are inserted into the nail insertion holes, and the nails of the base plate and overlapped part stick and are fixed to the beam. Therefore, the first anchorage and the second anchorage are overlapped, and they are fixed at the corner part of the connection part of the beam and joint integrally.

Therefore, it can fix certainly without moving the connection part between the beam and joint when the earthquake occurs, or the contraction of wood is happened.

(2) As discussed above, since there is only a hammer work, everyone can perform easily and comfortably.

(3) As discussed above, since it is not necessary to form the bolt insertion hole in the beam or joint, it can be used without reducing the intensity of the beam and joint.

(4) As discussed above, the first and second anchorages are formed with punching so that it can be manufactured cheaply and can process easily.

What is claimed is:

1. An anchorage used at a corner part of woods comprising:

a first anchorage including a first anchorage body formed in the shape of a L letter; a plurality of nails formed in the shape of a pin, punching on a long side plate of the first anchorage body; and a plurality of nail insertion holes formed in the shape of a pin and formed at the short side plate of the first anchorage body; and a second anchorage including a second anchorage body formed in the shape of a crank, forming via a bended part which overlaps with the short side plate of the first anchorage; a plurality of nails formed in the shape of a pin, punching on a base plate of the second anchorage body; and a plurality of nails formed in the shape of an overlapped pin, punching on an overlapped part of the second anchorage body so as to insert into the nail insertion holes of the first anchorage.

2. An anchorage used at a corner part of woods comprising:

a first anchorage including a first anchorage body formed in the shape of an angle; a plurality of nails formed in the shape of a pin, said nails punching exterior to said angle on one plate of the first anchorage body; and a plurality of nail insertion holes formed in the shape of a pin and formed at another short side plate of the first anchorage body; and a second anchorage including a second anchorage body, capable of overlapping with the other side plate of the first anchorage; and a plurality of nails formed in the shape of an overlapped pin, punching so as to insert into the nail insertion holes of the first anchorage, having the insertion amount as the same as the insertion amount of the nails of the first anchorage to the wood.

3. An anchorage used at a corner part of woods comprising:

a first anchorage including a first anchorage body formed in the shape of a L letter; a plurality of nails formed in the shape of a pin, punching on a long side plate of the first anchorage body; and a plurality of nail insertion holes formed in the shape of a pin and formed at the short side plate of the first anchorage body; and a second anchorage including a second anchorage body formed in the shape of a crank, forming via a bended part which overlaps with the short side plate of the first anchorage; a plurality of nails formed in the shape of a pin, punching on a base plate of the second anchorage body; and insertion holes at the overlapped part of the second anchorage body, corresponding to the nail insertion holes provided at the short side plate of the first anchorage.

* * * * *